US012774656B2

(12) United States Patent
Eardley et al.

(10) Patent No.: US 12,774,656 B2
(45) Date of Patent: Oct. 27, 2026

(54) AIR MOTOR WITH INCREASED DWELL AT MAX VANE EXTENSION

(71) Applicant: Ingersoll-Rand Industrial U.S., Inc., Davidson, NC (US)

(72) Inventors: Edward C. Eardley, Easton, PA (US); Timothy R. Cooper, Titusville, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 180 days.

(21) Appl. No.: 18/647,445

(22) Filed: Apr. 26, 2024

(65) Prior Publication Data

US 2024/0368992 A1 Nov. 7, 2024

Related U.S. Application Data

(60) Provisional application No. 63/464,402, filed on May 5, 2023.

(51) Int. Cl.

| | |
|---|---|
| ***B25D 11/06*** | (2006.01) |
| ***F01C 1/348*** | (2006.01) |
| ***F01C 21/08*** | (2006.01) |

(52) U.S. Cl.
CPC ........ *F01C 21/0836* (2013.01); *B25D 11/066* (2013.01); *F01C 1/348* (2013.01)

(58) Field of Classification Search
CPC ........ F01C 3/04; F01C 1/348; F01C 21/0836; F01C 20/04; F01C 21/006; F01C 13/02;
(Continued)

(56) References Cited

U.S. PATENT DOCUMENTS

| | | | |
|---|---|---|---|
| 1,922,951 | A | 8/1933 | Hawley |
| 2,347,944 | A | 5/1944 | Elbert |

(Continued)

FOREIGN PATENT DOCUMENTS

| | | | | |
|---|---|---|---|---|
| BE | 1031636 A1 * | 12/2024 | ............ | F16N 13/20 |
| DE | 19848307 A1 | 4/1999 | | |

(Continued)

OTHER PUBLICATIONS

Extended European Search Report for application No. 24173338.5, dated Sep. 27, 2024.

(Continued)

*Primary Examiner* — Robert F Long
(74) *Attorney, Agent, or Firm* — Kevin E. West; Advent, LLP

(57) ABSTRACT

A pneumatic motor includes a stator having a stator inner wall including a dwell region and a rotor eccentrically disposed within the stator. The rotor is configured to rotate about the axis of rotation and includes a plurality of vanes disposed around the rotor. Each vane of the plurality of vanes is configured to slide within a respective slot formed in the outer surface of the rotor between a fully retracted position and a fully extended position as the rotor rotates about the axis of rotation to maintain contact with the stator inner wall. The stator inner wall has a radius relative to the axis of rotation that is substantially constant within the dwell region so that vanes of the plurality of vanes are in the fully extended position within the dwell region.

16 Claims, 12 Drawing Sheets

(58) Field of Classification Search
CPC ...... F01C 21/106; F01C 1/344; B25D 11/066; F04C 29/06; F04C 2270/12; F04C 2270/13; F04C 2270/14; F04C 2250/30
USPC ....... 173/93.5, 81, 90, 140–141, 162.1, 197, 173/198, 213, 168–171; 408/1, 8–15, 67, 408/76, 115, 145, 207, 230, 224, 227
See application file for complete search history.

(56) References Cited

U.S. PATENT DOCUMENTS

| | | | |
|---|---|---|---|
| 2,352,941 A | 7/1944 | Curtis | |
| 2,359,903 A | 10/1944 | Fanning | |
| 2,733,687 A * | 2/1956 | Schmid | F03C 2/304 418/82 |
| 2,791,185 A | 5/1957 | Bohnhoff et al. | |
| 3,286,913 A | 11/1966 | Kaatz et al. | |
| 3,565,558 A | 2/1971 | Tobacman | |
| 3,785,758 A | 1/1974 | Wilcox et al. | |
| 3,877,127 A | 4/1975 | Takahashi et al. | |
| 3,954,358 A | 5/1976 | Normandin | |
| 4,163,635 A * | 8/1979 | Sakamaki | F01C 21/0809 418/236 |
| 4,299,097 A | 11/1981 | Shank et al. | |
| 4,410,305 A | 10/1983 | Shank et al. | |
| 4,419,059 A | 12/1983 | Anderson | |
| 4,501,537 A | 2/1985 | Ishizuka | |
| 4,515,514 A | 5/1985 | Hayase et al. | |
| 4,556,372 A | 12/1985 | Leroy et al. | |
| 4,616,984 A | 10/1986 | Inagaki et al. | |
| 4,737,090 A | 4/1988 | Sakai et al. | |
| 4,802,830 A | 2/1989 | Nakajima | |
| 5,293,747 A * | 3/1994 | Geiger | F01C 20/26 60/494 |
| 5,302,096 A | 4/1994 | Cavalleri | |
| 5,310,326 A * | 5/1994 | Gui | F04C 18/3441 418/152 |
| 5,316,456 A | 5/1994 | Eckhardt | |
| 5,431,552 A | 7/1995 | Davis et al. | |
| 5,525,842 A * | 6/1996 | Leininger | B25B 23/18 290/43 |
| 5,558,511 A | 9/1996 | Hedelin | |
| 5,582,020 A | 12/1996 | Scaringe et al. | |
| 5,888,058 A | 3/1999 | Leroy et al. | |
| 6,030,191 A | 2/2000 | Wood et al. | |
| 6,227,832 B1 | 5/2001 | Rechberger | |
| 6,236,897 B1 | 5/2001 | Lee et al. | |
| 6,250,399 B1 * | 6/2001 | Giardino | F01C 13/02 173/221 |
| 6,503,068 B2 | 1/2003 | Kojima et al. | |
| 8,225,607 B2 | 7/2012 | Stegmair et al. | |
| 2003/0121680 A1 * | 7/2003 | Izumisawa | B25F 5/00 173/93.5 |
| 2006/0113099 A1 * | 6/2006 | Livingston | F01C 20/04 173/93.5 |
| 2009/0175750 A1 * | 7/2009 | Ascari | F01C 21/0836 418/80 |
| 2010/0319654 A1 * | 12/2010 | Messmer | F01C 1/3442 123/243 |
| 2011/0068141 A1 * | 3/2011 | Wolf | B25C 1/08 227/9 |
| 2011/0142702 A1 * | 6/2011 | Pekrul | F01K 13/00 418/269 |
| 2013/0177466 A1 | 7/2013 | Blackburn | |
| 2013/0202468 A1 | 8/2013 | Patterson et al. | |
| 2013/0202470 A1 * | 8/2013 | Liang | F01C 19/02 418/104 |
| 2013/0209299 A1 | 8/2013 | Santos et al. | |
| 2014/0020923 A1 * | 1/2014 | Su | B25B 21/02 173/218 |
| 2024/0351180 A1 * | 10/2024 | Eardley | B25F 5/00 |
| 2024/0368992 A1 * | 11/2024 | Eardley | F01C 21/0836 |

FOREIGN PATENT DOCUMENTS

| | | | |
|---|---|---|---|
| FR | 3033370 A1 * | 9/2016 | F01C 21/0809 |
| GB | 534510 A | 3/1941 | |
| GB | 1413427 A | 11/1975 | |
| GB | 2394008 A * | 4/2004 | F04C 29/026 |

OTHER PUBLICATIONS

Battarra, Mattia et al., “Analytical determination of the vane radial loads in balanced vane pumps”, Mechanism and Machine Theory, Jul. 28, 2020, pp. 1-19, vol. 154, Elsevier, Ferrara, Italy, XP86266842.
Communication pursuant to Article 94(3) EPC for Patent Application No. 24173338.5, dated Sep. 19, 2025.

* cited by examiner

| CAM PROFILE TYPE | Stall Torque of specific cam type at max vane extension angle | | | | | | | | |
|---|---|---|---|---|---|---|---|---|---|
| | Max vane rise angle (degrees) | | | | | | | | |
| | | 180 | 150 | 135 | 120 | 90 | 60 | 45 | 30 |
| CYL | Average Stall Torque (Lbs-In) | 38.31 | | | | | | | |
| LIN | | 34.28 | 39.61 | 40.86 | 40.89 | 40.37 | 39.29 | 38.17 | 35.83 |
| PAR | | 39.45 | 41.93 | 42.13 | 42.07 | 41.76 | 40.86 | 39.56 | 36.17 |
| HAR | | 38.84 | 41.80 | 42.06 | 41.98 | 41.62 | 40.62 | 39.30 | 36.15 |
| CYC | | 40.54 | 42.27 | 42.33 | 42.28 | 42.06 | 41.22 | 39.85 | 36.23 |

AIR MOTOR WITH INCREASED DWELL AT MAX VANE EXTENSION

BACKGROUND

Pneumatic rotary tools include pneumatic motors that receive compressed air and convert energy from the compressed air into mechanical work. The mechanical work produced by the pneumatic motor may be converted in the form of rotary motion or linear motion. Pneumatic motors that produce rotary motion include vane-type pneumatic motors, piston pneumatic motors, air turbines, and gear-type motors.

DRAWINGS

The Detailed Description is described with reference to the accompanying figures. The use of the same reference numbers in different instances in the description and the figures may indicate similar or identical items.

DETAILED DESCRIPTION

Figure 1:
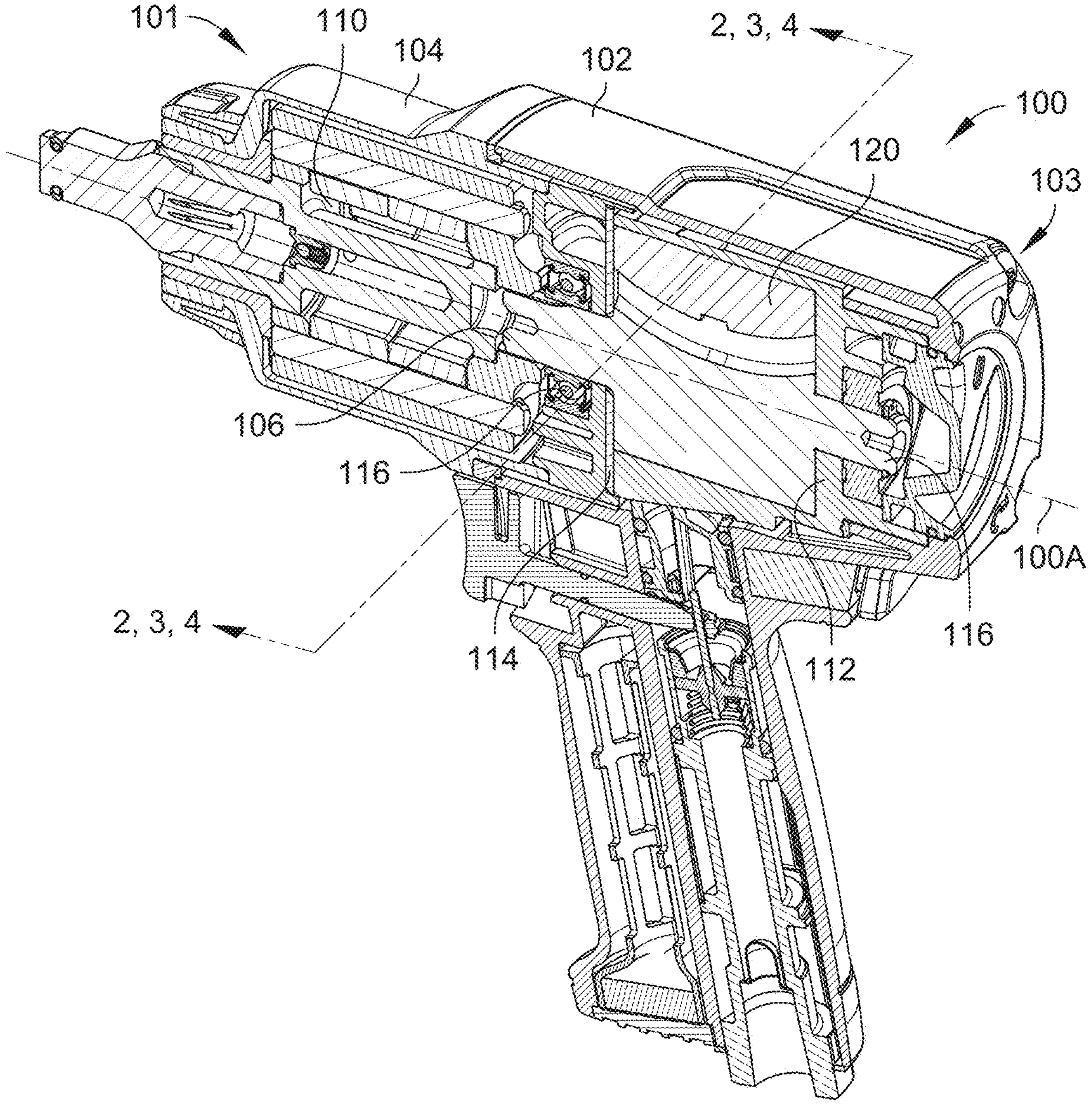
FIG. 1 is a cross-sectional side view illustrating a power tool assembly in accordance with example embodiments of the present disclosure.

For the purpose of promoting an understanding of the principles of the subject matter, reference will now be made to the embodiments illustrated in the drawings and specific language will be used to describe the same. It will nevertheless be understood that no limitation of the scope of the subject matter is thereby intended. Any alterations and further modifications in the described embodiments, and any further applications of the principles of the subject matter as described herein are contemplated as would normally occur to one skilled in the art to which the subject matter relates.

Overview

Vane-type motors, also called rotary vane motors, are a type of pneumatic motor that uses a compressed fluid (typically compressed air) to produce rotational motion to rotate a shaft. Rotary vane motors include a slotted rotor eccentrically mounted on a stator. The rotor includes radially extending vanes extending from the slots around rotor. In typical pneumatic motors, the vanes extending from the rotor reach their full extension, or open at their maximum reveal, at one point along the length of travel, for example, only when reaching one-hundred and eighty degrees (180°) of rotation from the bottom of the rotor.

In order to increase the torque produced by a pneumatic motor, either the length of the motor or the diameter of the rotor and the stator may be increased. These solutions increase the overall size and weight of the pneumatic motors and the assemblies (e.g., handheld power tools) in which they are installed.

Another way to increase the torque produced by a pneumatic motor is to use a dual lobe sliding vane motor. However, dual lobe motors require different rotors having additional vanes and work with more complex flow paths to receive and deliver the compressed fluid used to rotate the rotor.

The pneumatic motor described herein includes a stator where the arc of the stator bore allows the vanes to fully extend before reaching one-hundred and eighty degrees (180°) (e.g., with respect to a tangential point/line between the rotor and the stator) and to remain extended for a longer duration of the cycle along the rotation of the rotor. This longer period of full vane extension allows the vane to be driven and maintained at a higher pressure and force throughout the duration of an arc length, resulting in an increase in motor torque when compared to a typical pneumatic motor having a cylindrical stator.

Since the vane is fully open through a greater angle of rotation, the moment arm of the force resulting from the pressure differential (e.g., the difference in pressure from one side of the vane to the other acting at the centroid of the pressurized portion of the vane) about the axis of rotation of the rotor is greater Thus, this increase in the moment arm provided by the vanes about the axis of rotation also increases the resulting torque of the pneumatic motor. The stator bore of the pneumatic motor described herein increases the performance of the pneumatic motor without adding additional weight to the pneumatic motor. Additionally, the pneumatic motor described herein does not require a change to the flow paths leading to and from the pneumatic motor. Additionally, example embodiments of the pneumatic motor reduce the jerk of the rotor as it accelerates and decelerates.

Detailed Description of Example Embodiments

Referring generally to FIGS. 1 through 4, a power tool assembly 100 having a pneumatic motor 120 with increased max vane extension is described. FIG. 1 shows an illustrative embodiment of the power tool assembly 100 in accordance with the present disclosure. The power tool assembly 100 includes a housing 102 having a front end 101 and a rear end 103. The power tool assembly 100 may include a hammer case 104 that houses an impact assembly 110. The housing 102 houses the pneumatic motor 120. The pneumatic motor 120 receives a flow of high pressure air and produces a resulting torque and rotational speed that rotates a shaft 106 coupled to the impact assembly 110 around an output axis 100A. The output axis 100A extends from the front end 101 to the rear end 103. The flow of high pressure air is supplied to the power tool assembly 100 from a compressed air source, for example, an air compressor (not shown) coupled to the power tool assembly 100.

In the embodiments discussed, the power tool assembly 100 is configured to receive the compressed air from the compressed air source to actuate the pneumatic motor 120. However, in other embodiments, the power tool assembly 100 may use a different compressed fluid as a medium to rotate the pneumatic motor 120. For example, the power tool assembly 100 may be coupled to a source of compressed nitrogen or other compressed gas supplies the energy to rotate the pneumatic motor 120.

In the embodiment shown in FIG. 1, the power tool assembly 100 is an impact wrench. However, it should be understood that in other embodiments, the power tool assembly 100 may be selected from a group including, but not limited to, pulse tools, torque wrenches, screwdrivers, drills, grinders, sanders, tire changers, and other pneumatic tools that uses a vane-type pneumatic motor. Additionally, the pneumatic motor 120 may be included in other industrial applications including, but not limited to, hoists, winches, engine starters, and other equipment/machinery using compressed air to drive a rotor. The pneumatic motor 120 may also be used as a free-standing pneumatic motor employed in industrial, manufacturing, and commercial applications where a compressed air source drives a rotor to deliver a torque.

The power tool assembly 100 may further include a rear end plate 112 and a front end plate 114 disposed in proximity to the pneumatic motor 120 and configured to limit axial displacement of the pneumatic motor 120 within the housing 102. The rear end plate 112 and the front end plate 114 may include bearings 116 that allow the rotation of the pneumatic motor 120 around the output axis 100A. The housing 102 may include a gear set assembly (not shown) connecting the pneumatic motor 120 with the impact assembly 110.

The pneumatic motor 120 includes a stator 124 having a stator inner wall 125 that defines a stator bore 126. The stator bore 126 houses an eccentrically mounted rotor 122 having a plurality of slots 123 around the circumference of the rotor 122. The plurality of slots 123 holds a plurality of vanes 128 disposed around the rotor 122, where each one of the plurality of vanes 128 includes a vane leading edge 127. The plurality of vanes 128 extends radially from the rotor 122 and is configured to slide in and out of the respective plurality of slots 123 as the rotor 122 rotates within the stator bore 126. In example embodiments, the plurality of vanes 128 may extend from the plurality of slots 123 using the air pressure from the flow of high pressure air or may use a biasing component disposed within the plurality of slots 123, such as but not limited to springs (not shown), etc. When extended, the plurality of vanes 128 closes off the space between the rotor 122 and the stator inner wall 125. In other embodiments (not shown) the pneumatic motor 120 is an offset vane motor.

Figure 2:
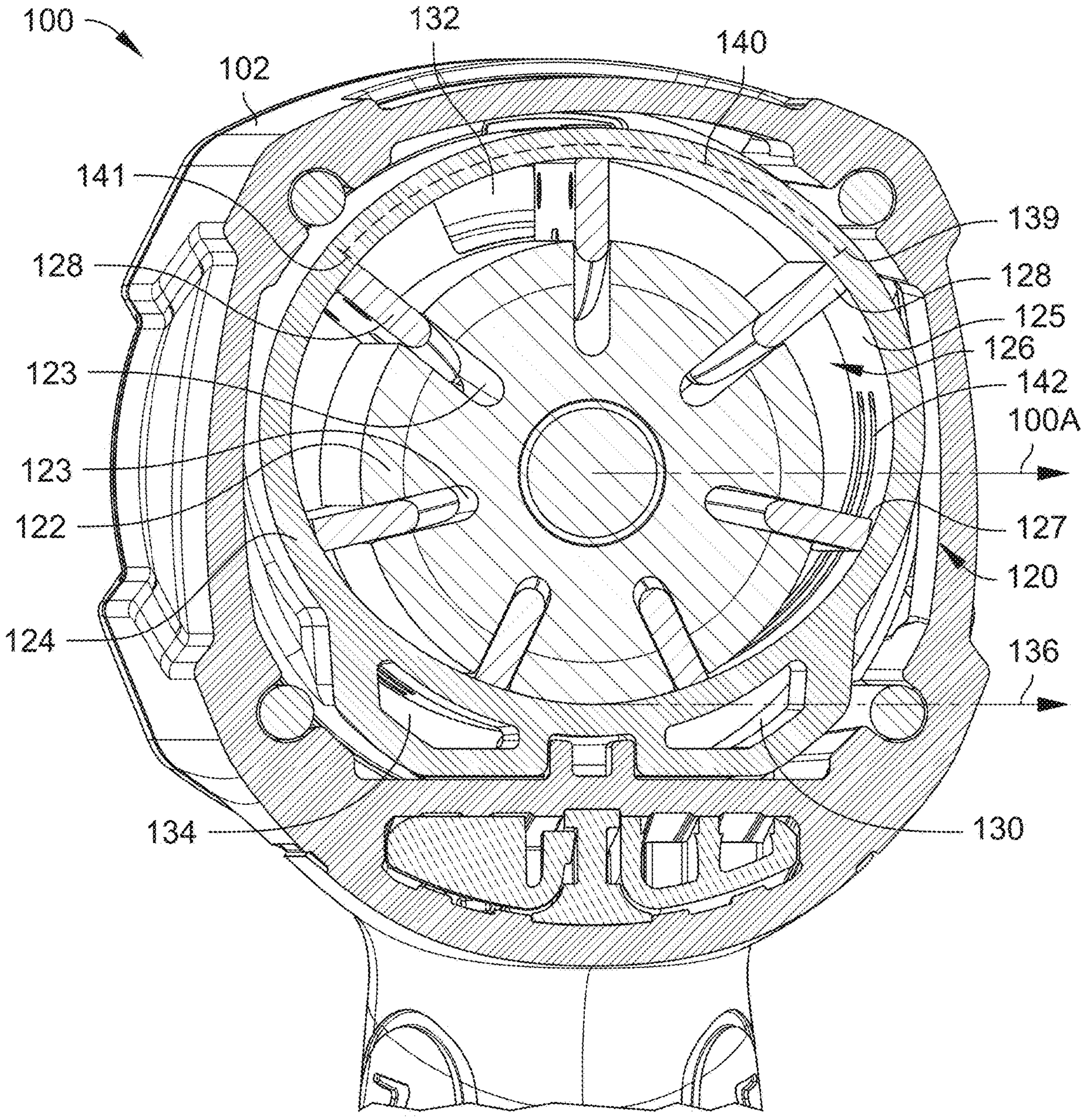
FIG. 2 is a cross-sectional isometric view illustrating a pneumatic motor having a double dwell stator geometry, in accordance with example embodiments of the present disclosure.
Figure 3:
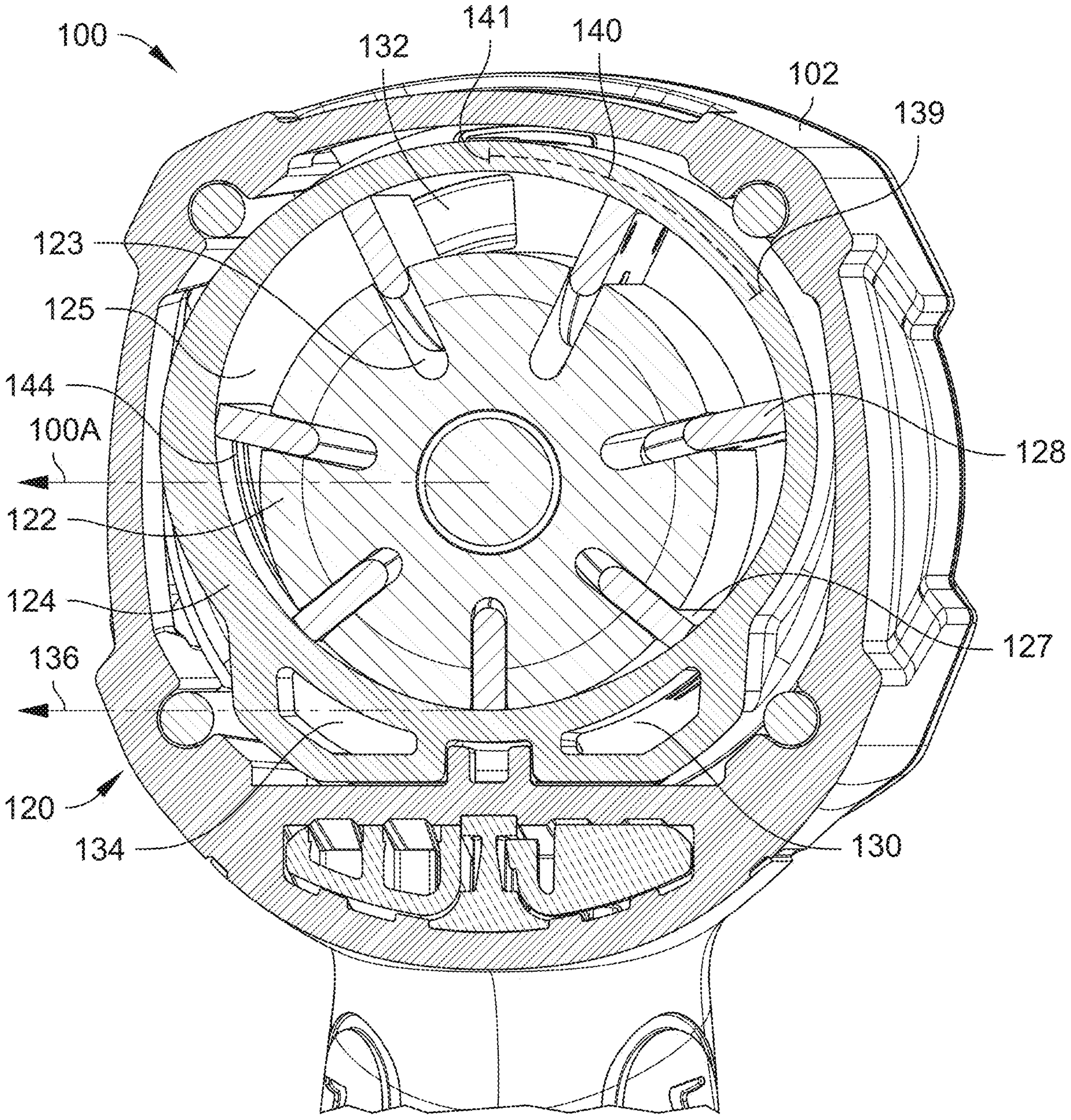
FIG. 3 is a cross-sectional isometric view illustrating a pneumatic motor having a single dwell stator geometry including a first stator half and a second stator half, in accordance with example embodiments of the present disclosure.

The rotor 122 is coaxial with and rotates about the output axis 100A. The pneumatic motor 120 further includes an air inlet 130, a primary air outlet 132, and a residual air outlet 134, as shown in FIGS. 2 and 3. The air inlet 130 is in fluid communication with at least one air inlet opening 142 located on the stator inner wall 125. The residual air outlet 134 is in fluid communication with at least one residual air outlet opening 144 located on the stator inner wall 125 opposite to the at least one air inlet opening 142. In other example embodiments, the air inlet 130, the primary air outlet 132, and the residual air outlet 134 may be disposed in the rear end plate 112 and/or the front end plate 114.

As used herein, descriptions which refer to angular rotation (e.g., 90°, 180°, etc.) will be understood to be an angular rotation relative to the rotor 122 depicted in FIG. 2. In the embodiment shown, the rotor 122 is rotating in a counterclockwise direction as viewed from the perspective of FIG. 2. It will be appreciated that such angular measurements can either be absolute or relative measurements depending on the context, where the absolute angular measurements are referenced starting at a tangential line 136 (where the rotor 122 and the stator inner wall 125 are tangent to each other) at zero degrees (0°) angle and which progresses in a counterclockwise direction. In other embodiments (not shown) the tangential line 136 may be disposed before or after the zero degrees (0°) angle.

As the plurality of vanes 128 rotates over the at least one air inlet opening 142, the plurality of vanes 128 traps a pocket of compressed air between adjacent vanes that is then transported to the primary air outlet 132. Prior to being exhausted through the primary air outlet 132, the pressure of the compressed air exerts a force on the plurality of vanes 128. As the force exerted on the plurality of vanes increases, so does the resultant torque supplied by the pneumatic motor 120. As the plurality of vanes 128 continues rotating past the primary air outlet 132, and the chamber volume between adjacent vanes is reduced, there is pressure buildup of the residual air left on the chamber after the primary air outlet 132. The residual air remaining between adjacent vanes is exhausted through the at least one residual air outlet opening 144 prior to starting the rotational cycle again at the tangential line 136.

Figure 4:
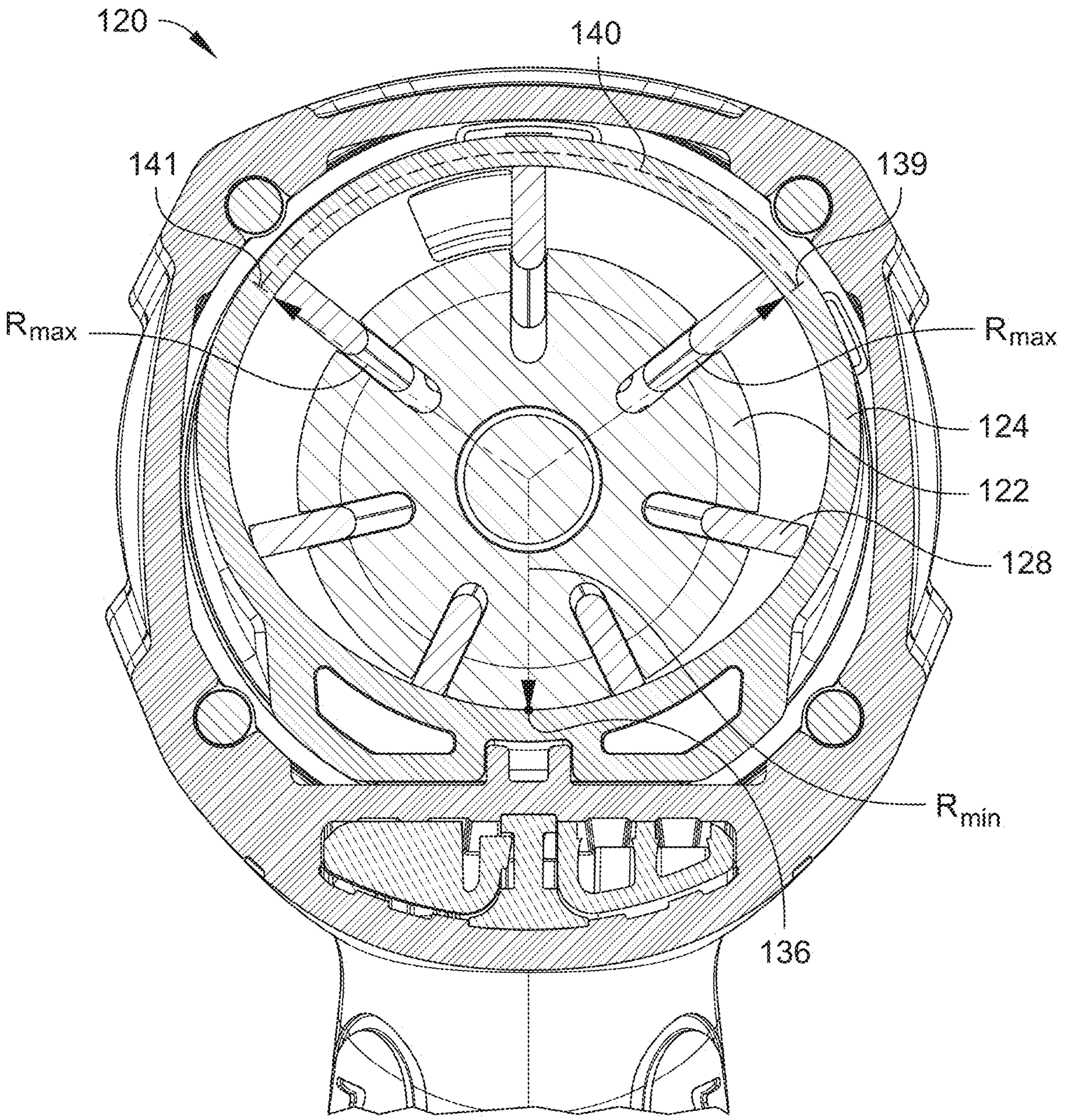
FIG. 4 is a cross sectional rear view of the pneumatic motor shown in FIG. 2, in accordance with example embodiments of the present disclosure.

Referring to FIG. 4, the plurality of vanes 128 is in contact with the stator inner wall 125 at a point of minimum vane extension $R_{min}$, where each one of the plurality of vanes 128 is fully or almost fully contained within the respective one of the plurality of slots 123, for example, at the tangential line 136. The vanes 128 are in contact with the stator inner wall 125 at maximum vane extension $R_{max}$, when the plurality of vanes 128 are fully extended from the respective plurality of slots 123.

In the embodiments shown, the stator inner wall 125 and the stator bore 126 define a dwell region 140 having a leading edge 139 and a trailing edge 141. The vanes 128 remain in maximum vane extension $R_{max}$ throughout the arc length of the dwell region. The dwell region 140 covers an arc length around the periphery of the stator bore 126 at which the plurality of vanes 128 extend and remain fully extended. The distance between the axis of rotation 100A and the stator inner wall 125 remains constant along the dwell region 140, making the dwell region 140 a constant radius arc relative to the center of the rotor 122. As each one of the plurality of vanes 128 rotates tangentially to the stator inner wall 125 along the dwell region 140, each one of the plurality of vanes 128 is fully extended along the arc length of the dwell region 140.

By defining this dwell region 140, the plurality of vanes may reach or more closely approach their full extension prior to reaching one-hundred and eighty degrees (180°) of rotation from the tangential line 136. While rotating across the arc length of the dwell region 140, the available vane surface area (e.g., the surface area across which the air pressure differential drives the vane) increases in comparison to a circular stator inner wall 125 defining a cylindrical stator bore 126. With the increased available vane surface area, the air pressure force acting on the vanes increases, even if the pressure differential across the vanes remains constant, resulting in an increased resultant motor torque.

In addition, the volume of the compressed air pockets, or chambers, created between adjacent ones of the plurality of vanes 128 and the stator inner wall 125 remains constant as each one of the plurality of vanes 128 approaches the primary air outlet 132. For this reason, the pressure in each chamber will not decrease as rapidly as it would in a cylindrical stator. Additionally, the compressed air does not need to expand as much from the point past the air inlet opening 142 to the primary air outlet 132 where each one of the plurality of vanes 128 exposes the chamber between adjacent vanes. Thus, the pressure of the chamber between adjacent vanes remains higher relative to the exhaust pressure, providing not only the increased vane area mentioned above, but also an increased pressure differential across the leading vane, which further acts to increase the force on the vane and hence the motor torque.

In example embodiments, the mean radius of the plurality of vanes 128 traveling across the arc length of the dwell region 140 is constant along the entirety of the dwell region 140. In other embodiments, the mean radius of the plurality of vanes 128 traveling across the arc length of the dwell region 140 is not constant along the entirety of the dwell region, but the mean radius of the plurality of vanes extends further out from the rotor 122 than the mean radius of vanes in a power tool without a dwell region 140. Thus, the resultant of the pressure force acts at a slightly increased radius about the axis of rotation 100A for the arc length of the dwell region 140. In this manner, the pneumatic motor 120 allows for a higher motor torque to be generated without a significant increase in the size of the motor 120 compared to typical motors without a dwell region 140 (e.g., motors with cylindrical stators).

In example embodiments, the stator 124 follows a cam profile on the stator bore 126 and the stator inner wall 125 between the point of minimum vane extension $R_{min}$ and the point of reaching maximum vane extension $R_{max}$. The profile of the stator bore 126 and the stator inner wall 125 provides a steady or constant rise from the tangential line 136 or the zero degrees (0°) angle/position until reaching the leading edge 139 of the dwell region 140. Depending on the cam profile (rise profile, motion curve) used, the vane acceleration and the derivative of the vane acceleration, also referred to as the jerk, may change. Having the stator inner wall 125 follow a cam profile allows the plurality of vanes 128 to follow a smooth rise transition between the point of minimum vane extension $R_{min}$ at the tangential line 136 and the leading edge 139 of the dwell region 140, i.e., the point of reaching the maximum vane extension $R_{max}$.

For example, the embodiment illustrated in FIG. 2 shows the stator 124 arranged following a cycloidal cam profile or motion curve. As the stator rotates, the plurality of vanes 128 rises or expands, following a cycloidal cam motion or motion curve. However, in other embodiments, the stator 124 may be arranged so that the plurality of vanes 128 follow at least one of a parabolic motion curve, a harmonic motion curve, etc.

Figure 5:
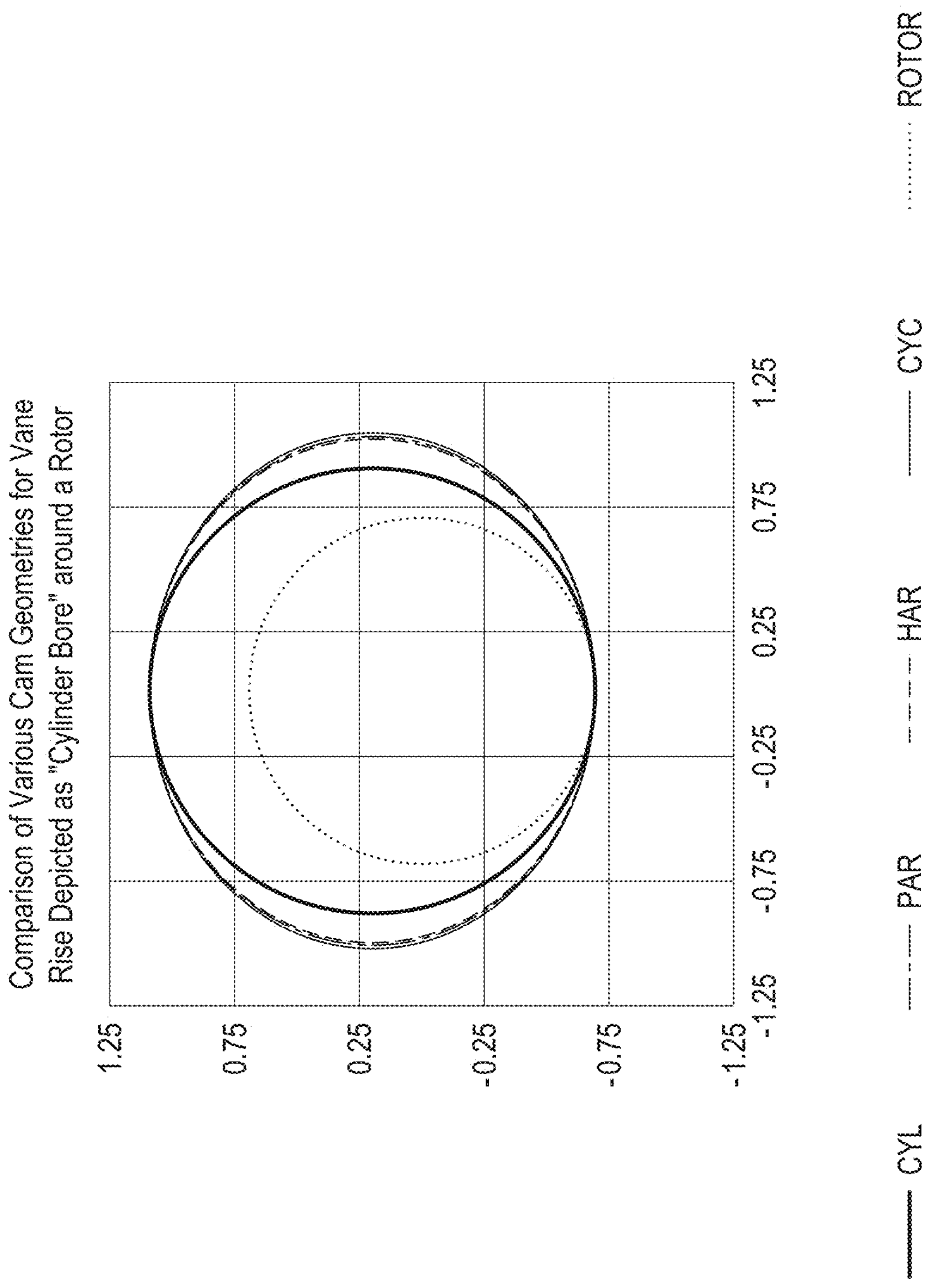
FIG. 5 is a graph illustrating a comparison of different cam geometries for a stator of a pneumatic motor, in accordance with example embodiments of the present disclosure.
Figure 6:
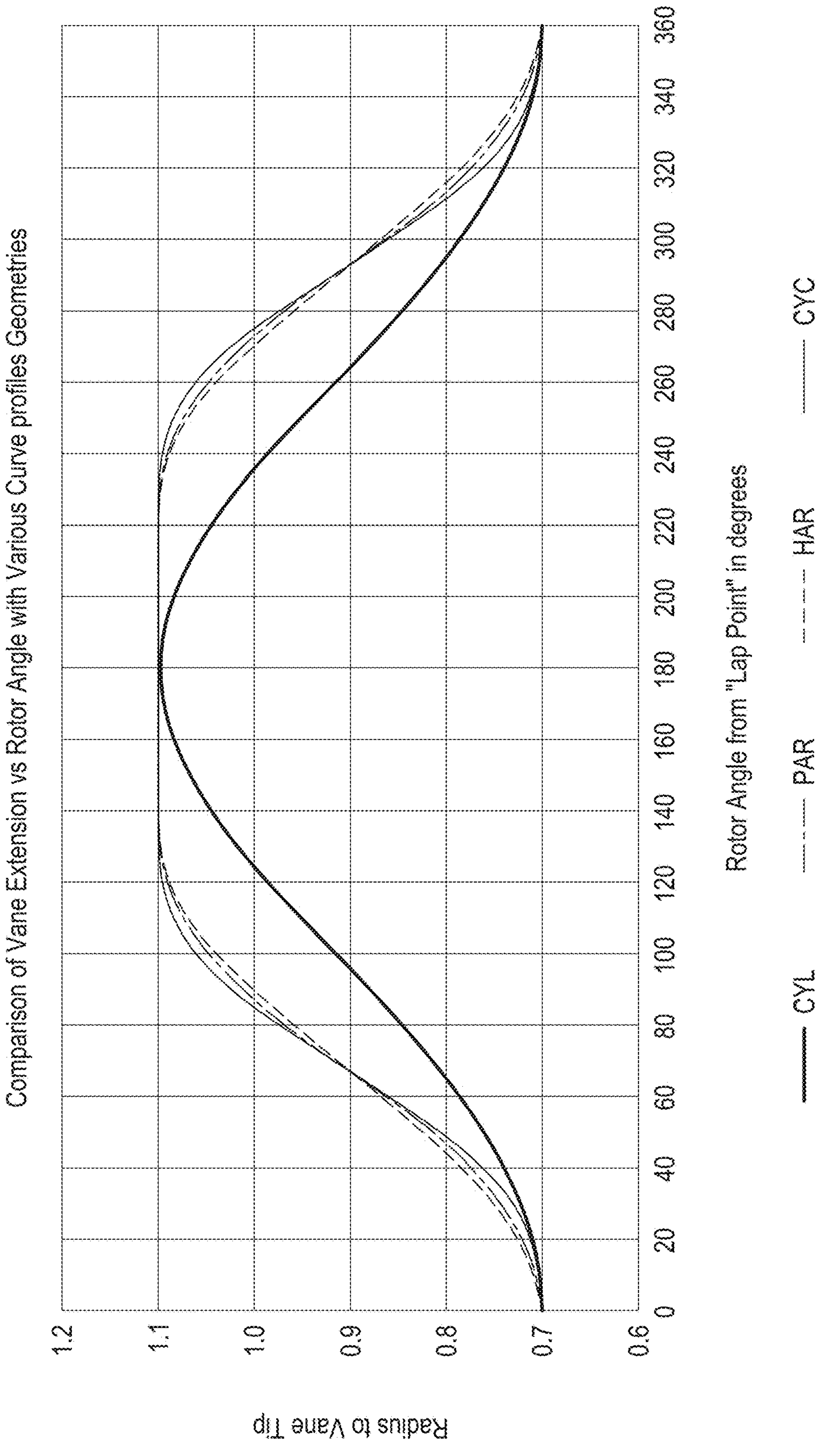
FIG. 6 is a graph illustrating a comparison of vane extensions of the different cam geometries of FIG. 5 versus the rotor angle in degrees, in accordance with example embodiments of the present disclosure.

Referring to FIG. 5, different embodiments of the cam geometry of the stator inner wall 125 are shown and compared to the standard geometry of a cylindrical stator. FIG. 6 shows a graph illustrating the angle of rotation at which the plurality of vanes 128 from the different embodiments (e.g., cycloidal, parabolic, harmonic) of the stator 124 reach their maximum vane extension and the length of rotation through which the maximum vane extension is maintained during the cycle of rotation (e.g., the arc length of the dwell region 140).

In embodiments, the leading edge 139 of the dwell region 140 may be located between one-hundred and twenty degrees (120°) and one-hundred and forty degrees (140°) from the tangential line 136. The trailing edge 141 of the dwell region 140 may be positioned between two-hundred and twenty degrees (220°) and two-hundred and forty degrees (240°) from the tangential line 136. For example, in the embodiment shown in FIG. 2, the leading edge 139 of the dwell region 140 is located at one-hundred and thirty-five degrees (135°) from the tangential line 136, while the trailing edge 141 of the dwell region 140 is located at two-hundred and twenty-five degrees (225°) from the tangential line 136, making the arc length of the dwell region 140 ninety degrees (90°).

It should be understood that the dwell region 140 may have an arc length longer than or shorter than ninety degrees (90°). For example, in an example embodiment, the arc length of the dwell region 140 may be forty-five degrees (45°), as shown in FIG. 3. FIG. 3 shows a stator 124 having the leading edge 139 of the dwell region 140 located at one-hundred and thirty-five degrees (135°) from the tangential line 136, while the trailing edge 141 of the dwell region 140 is positioned at one-hundred and eighty degrees (180°) from the tangential line 136, coinciding with the primary air outlet 132. In other embodiments, the leading edge 139 of the dwell region 140 may be located before or after one-hundred and thirty-five degrees (135°), while the trailing edge 141 of the dwell region 140 may be located before or after two-hundred and twenty-five degrees (225°).

In example embodiments, the primary air outlet 132 is disposed above the rotor 122 opposite to the tangential line 136 of the rotor 122 and the stator 124. For example, the primary air outlet 132 may be disposed at the one-hundred and eighty degrees (180°) position as shown in FIGS. 2 through 4. In other embodiments, the primary air outlet 132 may be located towards one of the leading edge 139 or the trailing edge 141 of the dwell region 140. For example, the primary air outlet 132 may be located at the one-hundred and ninety degrees (190°) position (not shown).

Typically, a fastener is rotated clockwise to be fastened and rotated counterclockwise to be unfastened. In embodiments where either the leading edge 139 or the trailing edge 141 of the dwell region 140 coincides with the primary air outlet 132, the pneumatic motor 120 may be biased towards a direction of rotation (forward biased, reverse biased). For example, the embodiment shown in FIG. 3 shows a reverse biased power tool 100. As the rotor 122 rotates counterclockwise, an increased torque is supplied by the pneumatic motor 120 as the plurality of vanes 128 are fully extended while traveling through the dwell region 140 prior to reaching the primary air outlet 132 and releasing the compressed air. If the direction of rotation is changed towards a clockwise direction, the plurality of vanes 128 are not fully extended until reaching the dwell region 140 at one-hundred and eighty degrees (180°) from the tangential line 136. Since the vanes 128 are not extended prior to the release of the compressed air through the primary air outlet 132, less torque is exerted by the motor 120 in comparison with the counterclockwise rotation. In this embodiment, the power tool may be reverse biased in order to provide a stronger torque when a user is unfastening a fastener (not shown).

In embodiments where the power tool 100 is reverse biased, the trailing edge 141 of the dwell region 140 coincides with the primary air outlet 132. For example, the trailing edge 141 of the dwell region and the primary air outlet 132 may be located at one-hundred and eighty degrees (180°) from the tangential line 136. In other embodiments (not shown), the pneumatic motor 120 may be forward biased. In a forward biased power tool 100, the leading edge 139 of the dwell region 140 may coincide with the primary air outlet 132. For example, the leading edge 139 of the dwell region and the primary air outlet 132 may be located at one-hundred and eighty degrees (180°) from the tangential line 136. It should be understood that the position of the primary air outlet 132 is an example embodiment, and the primary air outlet may be disposed at a different angle from the tangential line 136.

Figure 7:
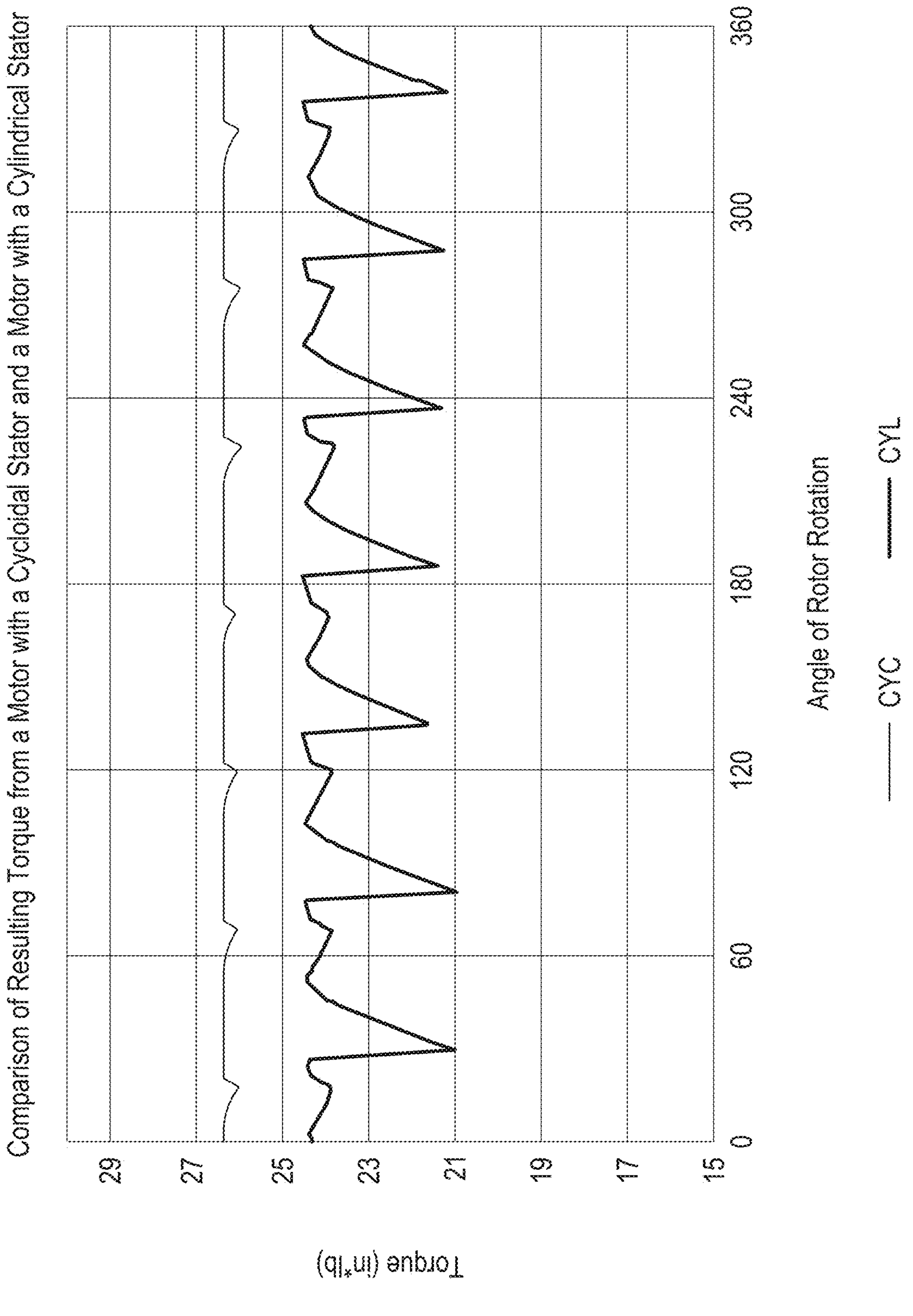
FIG. 7 is a graph illustrating a resulting torque comparison between a stator having a cycloidal cam profile and a stator having a cylindrical cam profile versus the rotor angle in degrees, in accordance with example embodiments of the present disclosure.

FIG. 7 shows a comparison of the resulting torque of the example embodiment shown in FIG. 2 compared to the resulting torque of a pneumatic motor having a cylindrical stator. As shown, the pneumatic motor 120 having the cycloidal stator 124 provides an increase in torque magnitude (higher torque) and a reduced torque variation compared to the pneumatic motor having a cylindrical stator. Having reduced torque variation, or a more constant torque, may be beneficial in torque control settings. For example, a user or a controller (not shown) in communication with the power tool 100 may be able to accurately assess the number of impacts needed to exert on a fastener to reach the desired torque.

Figure 8:
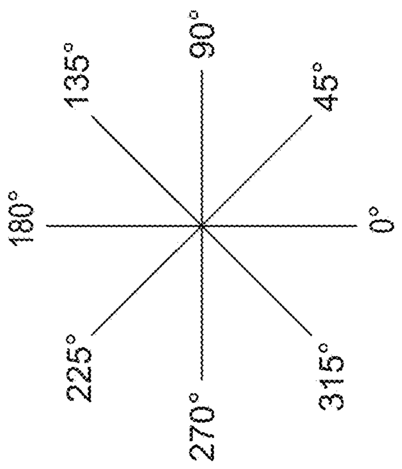
FIG. 8 is a chart illustrating a stall torque for different cam geometries at a maximum vane extension angle in degrees, in accordance with example embodiments of the present disclosure.

Referring to FIG. 8, different example embodiments of the cam profile of the stator 124 and stator bore 126 are compared, including a cylindrical cam profile (CYL), a linear cam profile (LIN), a parabolic cam profile (PAR), a harmonic cam profile (HAR), and a cycloidal cam profile (CYC). The chart shows a calculated motor performance or stall torque (the torque exerted by the pneumatic motor when the output rotational speed is zero) of the different cam profile embodiments based on different angles from the tangential line 136 zero degrees (0°) at which the point of maximum vane extension is reached. From the different embodiments shown, a pneumatic motor 120 having stator with a cycloidal cam profile has the largest stall torque when the maximum vane extension is reached at one-hundred and thirty-five degrees (135°) from the tangential line 136, with 42.33 In-Lbs.

As previously discussed, selecting a specific cam profile for the stator inner wall 125 between the point of minimum vane extension $R_{min}$ and the point at which maximum vane extension $R_{max}$ is reached may affect the way in which forces act on each one of the plurality of vanes 128 (vane loading). More specifically, when the pneumatic motor 120 is running at a fixed angular velocity ω (the time derivative of the rotor angle θ with respect to time, or ω=dθ/dt), the centrifugal force acting on the mass of the plurality of vanes 128 urges each one of the plurality of vanes 128 out of the respective ones of the plurality of slots 123 and into contact with the stator inner wall 125. Depending on the geometry of rise used (the cam profile), each one of the plurality of vanes 128 may rise and/or fall as their position/angle with respect to the tangential line 136 changes.

Similarly, depending on the cam profile of the stator 124, the pneumatic motor 120 may be configured to have a reduced jerk as it accelerates and decelerates the power tool 100. Jerk is the rate of change of an object's acceleration over time. Jerk is undesirable as it is associated with a resulting impact, which contributes to noise, surface wear of the plurality of vanes 128, and fatigue of the pneumatic motor 120. Since the angle of the rotor 122 changes with time at angular velocity ω, a vane radial velocity, a radial acceleration, and the radial jerk or "pulse" are defined. Different embodiments of the geometry of the stator inner wall 125 result in different rise profiles, radial velocities, accelerations, and jerks. The following equations define the derivatives of rise with respect to time. the radial velocity is:

$$\frac{drise}{dt} = \frac{drise}{d\theta}\frac{d\theta}{dt}$$

The radial acceleration is:

$$\frac{d^2rise}{dt^2} = \frac{drise}{d\theta}\frac{d^2\theta}{dt^2} + \frac{d^2rise}{d\theta^2}\left(\frac{d\theta}{dt}\right)^2$$

The radial jerk is:

$$\frac{d^3rise}{dt^3} = \frac{drise}{d\theta}\frac{d^3\theta}{dt^3} + \frac{d^2rise}{d\theta^2}\frac{d\theta}{dt}\frac{d^2\theta}{dt^2} + \frac{d^3rise}{d\theta^3}\left(\frac{d\theta}{dt}\right)^3$$

If the angular velocity ω of the rotor 122 is held constant, the radial velocity of the plurality of vanes 128 is:

$$\frac{drise}{dt} = \frac{drise}{d\theta}\omega$$

The radial acceleration of the plurality of vanes 128 is:

$$\frac{d^2rise}{dt^2} = \frac{d^2rise}{d\theta^2}\omega^2$$

And the radial jerk of the plurality of vanes 128 is:

$$\frac{d^3rise}{dt^3} = \frac{d^3rise}{d\theta^3}\omega^3$$

Figure 9:
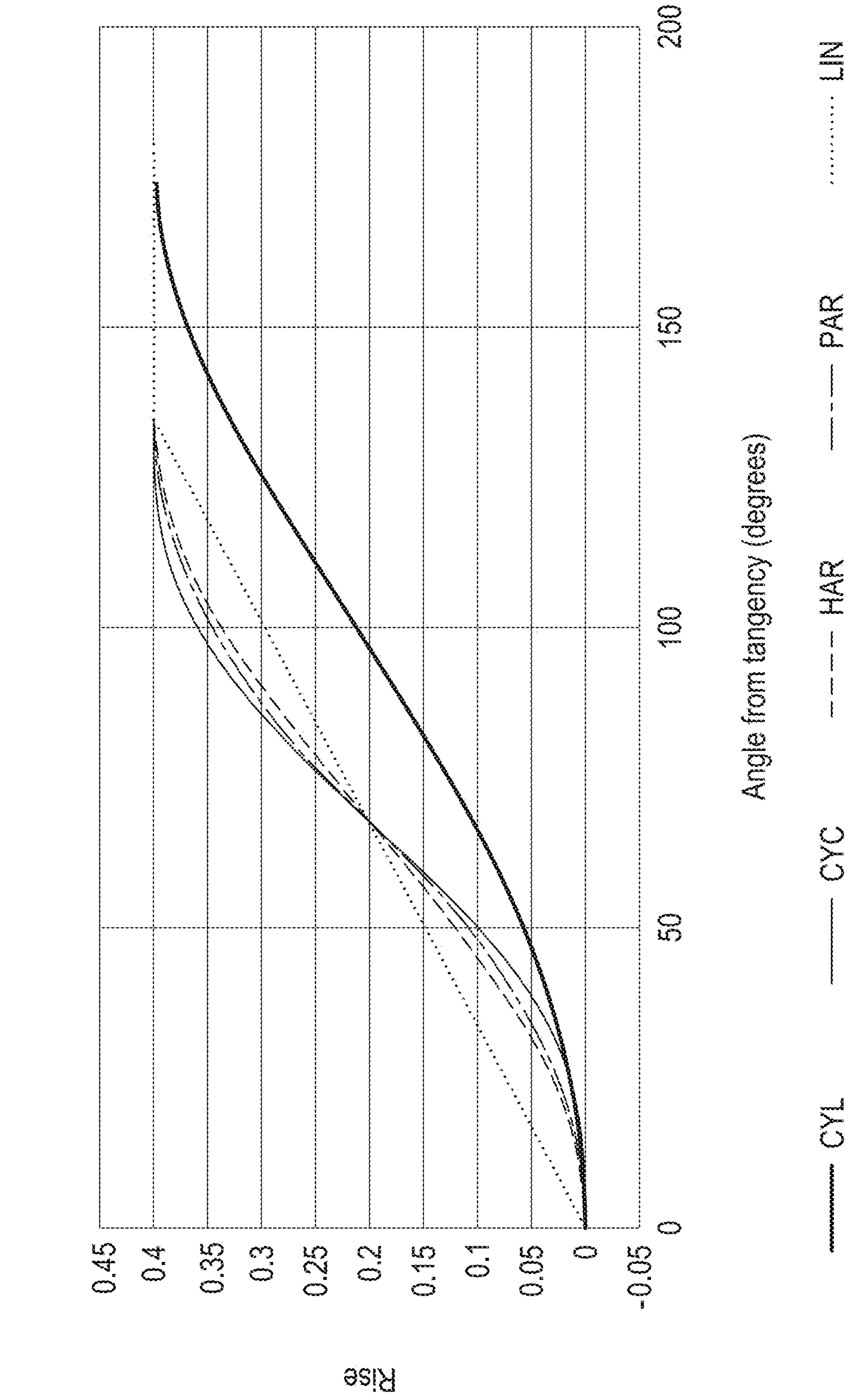
FIG. 9 is a graph illustrating vane rise versus an angle from tangency for the different cam geometries shown in FIG. 5, in accordance with example embodiments of the present disclosure.
Figure 10:
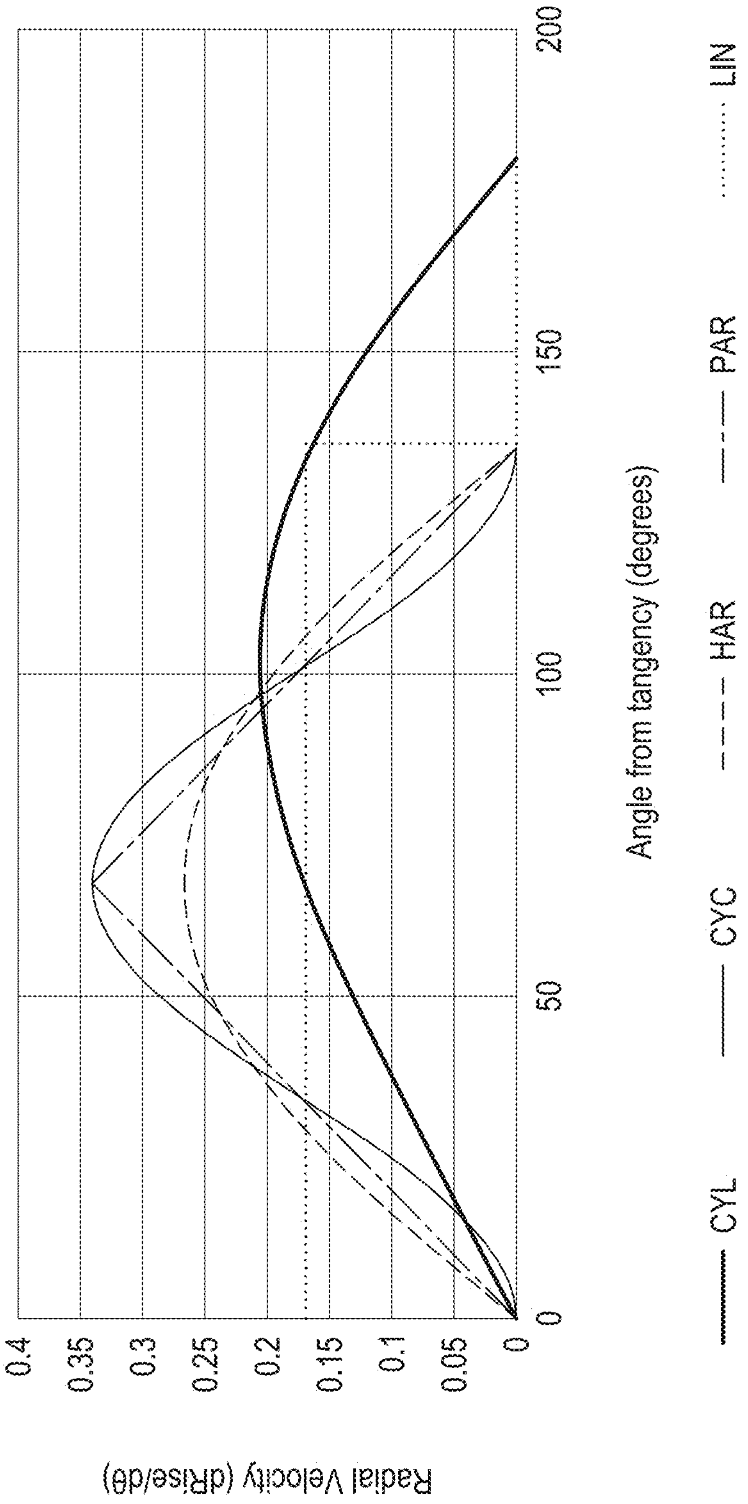
FIG. 10 is a graph illustrating vane radial velocity versus the angle from tangency for the different cam geometries shown in FIG. 5, in accordance with example embodiments of the present disclosure.
Figure 11:
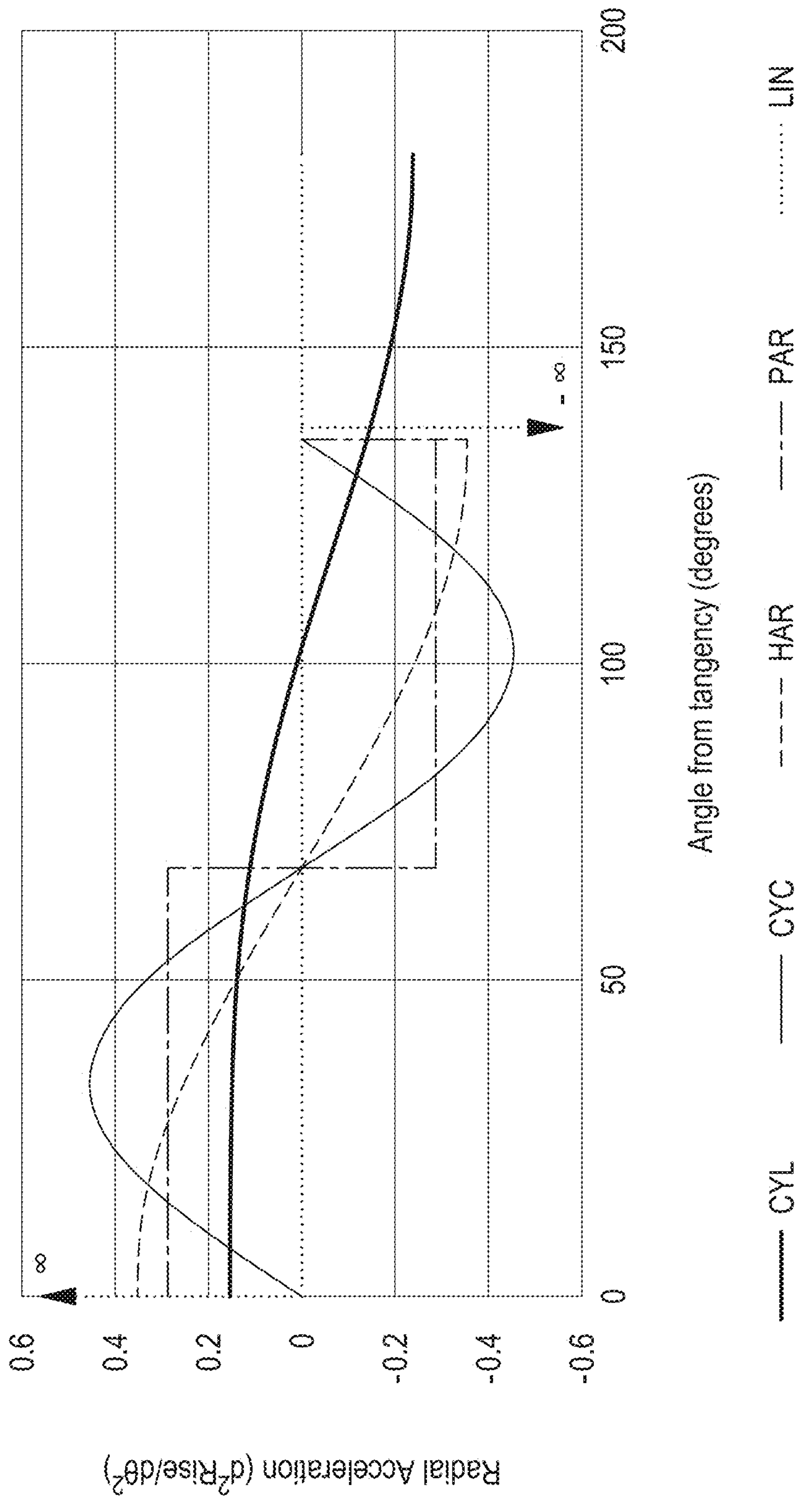
FIG. 11 is a graph illustrating vane radial acceleration versus the angle from tangency for the different cam geometries shown in FIG. 5, in accordance with example embodiments of the present disclosure.
Figure 12:
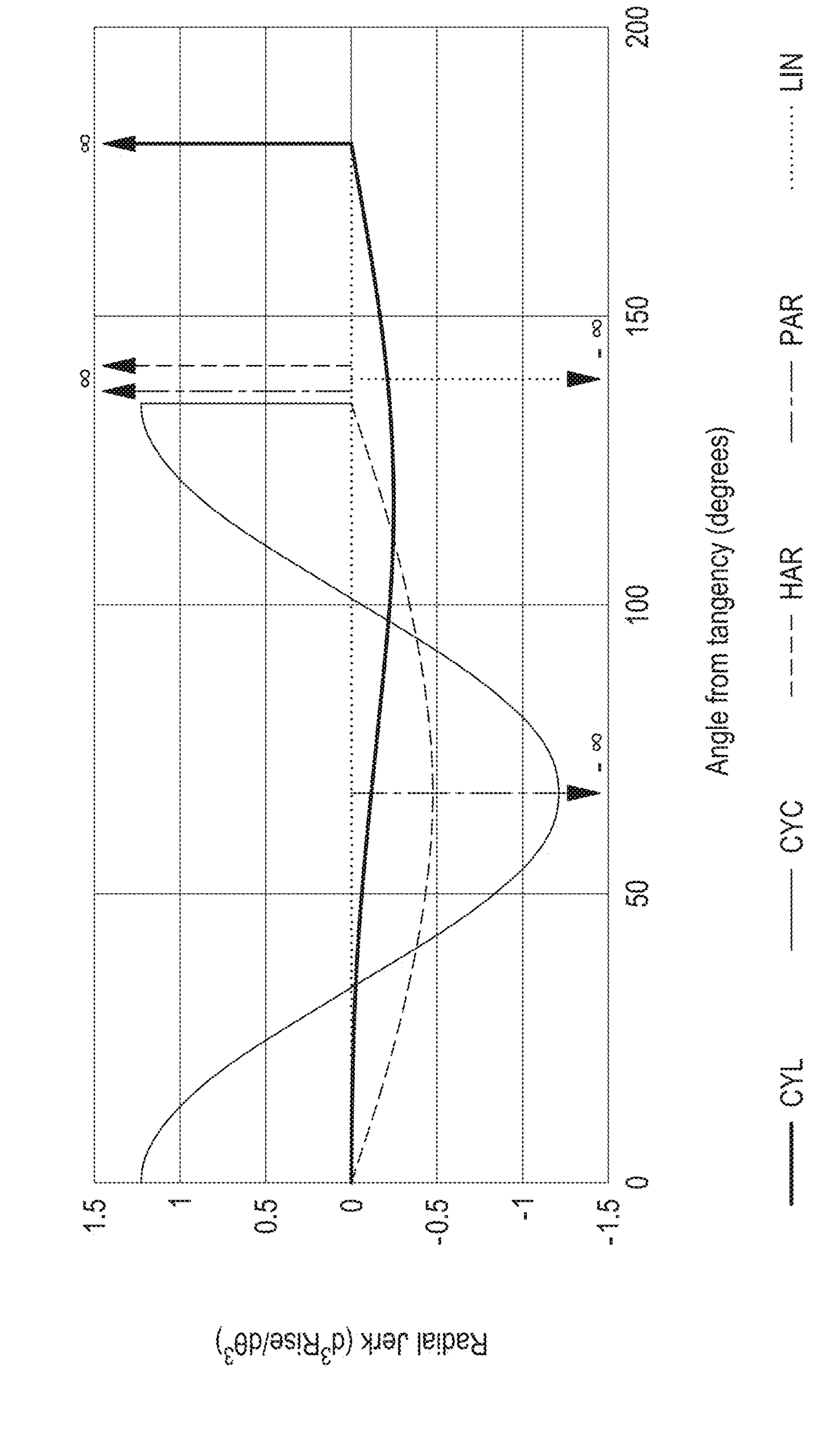
FIG. 12 is a graph illustrating vane radial jerk versus the angle from tangency for the different cam geometries shown in FIG. 5 in accordance with example embodiments of the present disclosure.

FIGS. 9 through 12 illustrate vane dynamics of the plurality of vanes 128 following example embodiments of the rise geometries/cam profiles discussed previously and shown in FIG. 5, with the addition of a linear rise (LIN) cam profile. The graphs show plots of rise and its derivatives versus rotor angle. FIG. 9 illustrates the rise of the plurality of vanes 128 with respect to the angle from the tangential line 136 (tangency). FIG. 10 illustrates the velocity of the plurality of vanes 128 with respect to the angle from tangency. FIG. 11 illustrates the acceleration of the plurality of vanes 128 with respect to the angle from tangency. FIG. 12 illustrates the jerk of the plurality of vanes 128 with respect to the angle from tangency.

Referring to FIG. 11, the radial acceleration of the plurality of vanes 128 is illustrated with respect to the angle of rotation of the rotor 122. As shown, when the dwell region 140 is reached (at the right hand side of the graph), all rise types (cam geometries) except the cycloid (and the linear rise, which had infinite accelerations at the end points) have finite values. Because the dwell region 140 extends over a constant radius, there is zero (0) radial velocity and zero (0) radial acceleration at the dwell region 140. The zero radial velocity and radial acceleration affect the jerk of the pneumatic motor 120.

Referring to FIG. 12, the radial jerk for all rise types, except the cycloidal cam profile, have infinite spikes of jerk or pulse that occur when the dwell region 140 is reached (and in the parabolic trace, hidden behind the linear trace with zero value, there is a negative spike halfway to the dwell where the acceleration changes signs). The spikes occur because all cam profiles, except for the cycloidal cam profile, have finite accelerations just prior to reaching the dwell region 140, while at the dwell region 140 the radial acceleration and velocity are zero. This change from finite to zero acceleration causes "infinite" jerk or pulse through each one of the plurality of vanes 128 as they extend from the respective plurality of slots 123 following the inner wall surface 125, shocking the plurality of vanes 128 and potentially impacting their life. Use of the cycloidal cam profile in example embodiments of the pneumatic motor 120 may eliminate the "infinite" jerk, providing a finite value as the transition from the rise to the dwell occurs and extending the life of the plurality of vanes 128.

While the subject matter has been illustrated and described in detail in the drawings and foregoing description, the same is to be considered as illustrative and not restrictive in character. In reading the claims, it is intended that when words such as "a," "an," or "at least one," are used there is no intention to limit the claim to only one item unless specifically stated to the contrary in the claim. Unless specified or limited otherwise, the terms "mounted," "connected," and "coupled" and variations thereof are used broadly and encompass both direct and indirect mountings, connections, supports, and couplings. Further, "connected" and "coupled" are not restricted to physical or mechanical connections or couplings.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A power tool assembly comprising:

a housing defining an axis of rotation;

an impact assembly configured to deliver a torque to a fastener; and a pneumatic motor configured to supply a motive force to the impact assembly, the pneumatic motor including:

a stator disposed within the housing, the stator having a stator inner wall including a dwell region, the dwell region covering an arc length of the stator inner wall, a rotor eccentrically disposed within the stator, the rotor configured to rotate about the axis of rotation and having an outer surface, and a plurality of vanes disposed around the rotor, each vane of the plurality of vanes configured to slide within a respective slot formed in the outer surface of the rotor between a fully retracted position and a fully extended position as the rotor rotates about the axis of rotation to maintain contact with the stator inner wall, wherein the stator inner wall has a radius relative to the axis of rotation that is substantially constant within the dwell region so that vanes of the plurality of vanes are in the fully extended position within the dwell region, wherein the dwell region of the stator inner wall includes a constant radius arc having a leading edge that begins at an angle of rotation relative to a tangential line that is less than one-hundred and eighty degrees (180°), where the tangential line is a line along the length of the rotor at which the rotor and the stator inner wall are tangent to each other, and wherein the leading edge of the dwell region is located between one-hundred and twenty degrees (120°) and one-hundred and forty degrees (140°) from the tangential line.

2. The power tool assembly of claim 1, wherein the constant radius arc of the stator inner wall includes a trailing edge that extends to an angle of rotation greater than one-hundred and eighty degrees (180°) relative to the tangential line.

3. The power tool assembly of claim 2, wherein the trailing edge of the dwell region is located between two-hundred and twenty degrees (220°) and two-hundred and forty degrees (240°) from the tangential line.

4. The power tool assembly of claim 1, wherein the constant radius arc of the stator inner wall includes a trailing edge that extends to an angle of rotation equal to one-hundred and eighty degrees (180°) relative to the tangential line.

5. The power tool assembly of claim 1, wherein the constant radius arc of the stator inner wall has an arc length of ninety degrees (90°).

6. The power tool assembly of claim 1, wherein the stator inner wall has a cam geometry following a cam profile that eases the transition of the plurality of vanes as they slide between the fully retracted position and the fully extended position.

7. The power tool assembly of claim 6, wherein the cam geometry follows one of a cycloidal motion curve, a parabolic motion curve, or a harmonic motion curve.

8. A pneumatic motor configured, the pneumatic motor comprising:

a stator disposed within a housing, the stator having a stator inner wall including a dwell region, the dwell region covering an arc length of the stator inner wall;

a rotor eccentrically disposed within the stator, the rotor configured to rotate about an axis of rotation and having an outer surface; and a plurality of vanes disposed around the rotor, each vane of the plurality of vanes configured to slide within a respective slot formed in the outer surface of the rotor between a fully retracted position and a fully extended position as the rotor rotates about the axis of rotation to maintain contact with the stator inner wall;

wherein the stator inner wall has a radius relative to the axis of rotation that is substantially constant within the dwell region so that vanes of the plurality of vanes are in the fully extended position within the dwell region, wherein the dwell region of the stator inner wall includes a constant radius arc having a leading edge that begins at an angle of rotation relative to a tangential line that is less than one-hundred and eighty degrees (180°), where the tangential line is a line along the length of the rotor at which the rotor and the stator inner wall are tangent to each other, and wherein the leading edge of the dwell region is located between one-hundred and twenty degrees (120°) and one-hundred and forty degrees (140°) from the tangential line.

9. The pneumatic motor of claim 8, wherein the constant radius arc of the stator inner wall includes a trailing edge that extends to an angle of rotation greater than one-hundred and eighty degrees (180°) relative to the tangential line.

10. The pneumatic motor of claim 9, wherein the trailing edge of the dwell region is located between two-hundred and twenty degrees (220°) and two-hundred and forty degrees (240°) from the tangential line.

11. The pneumatic motor of claim 8, wherein the constant radius arc of the stator inner wall includes a trailing edge that extends to an angle of rotation equal to one-hundred and eighty degrees (180°) relative to the tangential line.

12. The pneumatic motor of claim 8, wherein the constant radius arc of the stator inner wall has an arc length of ninety degrees (90°).

13. The pneumatic motor of claim 8, wherein the stator inner wall has a cam geometry following a cam profile that eases the transition of the plurality of vanes as they slide between the fully retracted position and the fully extended position.

14. The pneumatic motor of claim 13, wherein the cam geometry follows one of a cycloidal motion curve, a parabolic motion curve, or a harmonic motion curve.

15. A pneumatic motor configured to supply a motive force, the pneumatic motor comprising:

a stator disposed within a housing, the stator having a stator inner wall including a dwell region, the dwell region covering an arc length of the stator inner wall;

a rotor eccentrically disposed within the stator, the rotor configured to rotate about an axis of rotation and having an outer surface; and a plurality of vanes disposed around the rotor, each vane of the plurality of vanes configured to slide within a respective slot formed in the outer surface of the rotor between a fully retracted position and a fully extended position as the rotor rotates about the axis of rotation to maintain contact with the stator inner wall;

wherein the stator inner wall has a radius relative to the axis of rotation that is substantially constant within the dwell region so that vanes of the plurality of vanes are in the fully extended position within the dwell region, and where the stator inner wall has a cam geometry following a cycloidal cam profile that eases the transition of the plurality of vanes as they slide between the fully retracted position and the fully extended position, wherein the dwell region of the stator inner wall includes a constant radius arc having a leading edge that begins at an angle of rotation relative to a tangential line that is less than one-hundred and eighty degrees (180°), where the tangential line is a line along the length of the rotor at which the rotor and the stator inner wall are tangent to each other, and wherein the leading edge of the dwell region is located between one-hundred and twenty degrees (120°) and one-hundred and forty degrees (140°) from the tangential line.

16. The pneumatic motor of claim 15, wherein the constant radius arc includes a trailing edge located at an angle of rotation greater than or equal to one-hundred and eighty degrees (180°) relative to the tangential line.

* * * * *